United States Patent
Gaudet et al.

(10) Patent No.: US 8,857,837 B2
(45) Date of Patent: Oct. 14, 2014

(54) TRAILER FOR TRANSPORTING FREIGHT CONTAINERS AND METHOD OF USE

(75) Inventors: Joël Gaudet, Candiac (CA); Steve Asztalos, Angola, IN (US); Eric Lapalme, St-Ours (CA); Christopher Marris, Northwich (GB); Tibor Varga, Dollard-des-Ormeaux (CA)

(73) Assignee: Max-Atlas, St-Jean-sur-Richelieu (CA)

( * ) Notice: Subject to any disclaimer, the term of this patent is extended or adjusted under 35 U.S.C. 154(b) by 0 days.

(21) Appl. No.: 13/452,993

(22) Filed: Apr. 23, 2012

(65) Prior Publication Data

US 2012/0248727 A1     Oct. 4, 2012

Related U.S. Application Data

(62) Division of application No. 12/259,684, filed on Oct. 28, 2008, now Pat. No. 8,182,193.

(51) Int. Cl.
| | |
|---|---|
| *B60G 3/14* | (2006.01) |
| *B60P 1/02* | (2006.01) |
| *B60G 5/00* | (2006.01) |
| *B60G 11/27* | (2006.01) |

(52) U.S. Cl.
CPC . *B60P 1/025* (2013.01); *B60G 5/00* (2013.01); B60G 2200/132 (2013.01); *B60G 3/145* (2013.01); *B60G 11/27* (2013.01); B60G 2300/04 (2013.01); *B60G 3/14* (2013.01)
USPC .............. 280/124.128; 414/474; 280/789

(58) Field of Classification Search
CPC ............ B60G 3/14; B60G 3/145; B60G 5/00; B60G 5/02; B60G 21/00; B60G 21/02; B60G 21/20; B60G 2200/13; B60G 2200/132; B60G 2204/14; B60G 2204/143; B60G 2204/148; B62D 53/061; B62D 63/08
USPC ........... 280/124.128, 124.116, 676, 789, 797; 414/474
See application file for complete search history.

(56) References Cited

U.S. PATENT DOCUMENTS

| | | | | |
|---|---|---|---|---|
| 2,507,980 | A | * | 5/1950 | Knapp ................... 280/124.128 |
| 2,525,506 | A | * | 10/1950 | Wiedman ........................ 280/82 |
| 4,120,413 | A | | 10/1978 | Harris et al. |

(Continued)

FOREIGN PATENT DOCUMENTS

| | | |
|---|---|---|
| CA | 2007219 | 8/1990 |
| CA | 2110546 | 10/1994 |

(Continued)

*Primary Examiner* — Paul N Dickson
*Assistant Examiner* — Barry Gooden, Jr.
(74) *Attorney, Agent, or Firm* — Norton Rose Fulbright Canada LLP (57) ABSTRACT

A suspension assembly for securing a wheel to opposed sides of a container carrying frame. A pivoted wheel support arm is secured at a forward pivot end to a pivot pin retained in the frame. A wheel axle assembly is secured at the rear free end of the pivot arm and adapted to connect a wheel thereto and has a shock absorber connecting bracket. A shock absorber connecting member extends above the pivot pin and is pivotally displaceable in facial alignment with a stationary shock absorber connector secured to the frame. A shock absorber is retained captive between the shock absorber connecting member and the stationary shock absorber connector to absorb vertical displacement loads transmitted to the pivotal wheel support arm.

9 Claims, 13 Drawing Sheets

(56) References Cited

U.S. PATENT DOCUMENTS

| | | | |
|---|---|---|---|
| 4,257,623 A * | 3/1981 | Kawase et al. | 280/124.109 |
| 4,619,578 A * | 10/1986 | Routledge | 414/498 |
| 4,666,181 A * | 5/1987 | Wegner | 280/6.151 |
| 4,753,566 A * | 6/1988 | Wegner | 414/495 |
| 4,830,396 A * | 5/1989 | Gandiglio | 280/124.109 |
| 4,865,510 A * | 9/1989 | Wegner | 414/498 |
| 4,865,511 A * | 9/1989 | Wegner | 414/498 |
| 5,016,912 A * | 5/1991 | Smith et al. | 280/6.151 |
| 5,275,430 A * | 1/1994 | Smith | 280/6.151 |
| 5,417,540 A | 5/1995 | Cox | |
| 5,839,750 A * | 11/1998 | Smith | 280/683 |
| 6,045,317 A * | 4/2000 | Boucher et al. | 414/495 |
| 6,155,770 A | 12/2000 | Warhurst | |
| 6,260,645 B1 * | 7/2001 | Pawlowski et al. | 180/65.22 |
| 6,286,857 B1 * | 9/2001 | Reese et al. | 280/683 |
| 6,299,181 B1 * | 10/2001 | Ericksson | 280/6.156 |
| 6,398,251 B1 * | 6/2002 | Smith | 280/683 |
| 6,471,223 B1 * | 10/2002 | Richardson | 280/86.5 |
| 6,532,398 B2 | 3/2003 | Matsumoto | |
| 6,776,428 B2 * | 8/2004 | Strong | 280/124.128 |
| 6,910,844 B2 | 6/2005 | Trescott | |
| 7,108,271 B2 * | 9/2006 | Smith | 280/124.128 |
| 7,111,857 B2 * | 9/2006 | Timoney et al. | 280/124.128 |
| 7,484,744 B2 | 2/2009 | Galazin et al. | |
| 7,600,785 B2 | 10/2009 | Ramsey | |
| 8,182,193 B2 * | 5/2012 | Gaudet et al. | 414/495 |
| 2001/0045719 A1 * | 11/2001 | Smith | 280/124.116 |
| 2004/0032107 A1 * | 2/2004 | Timoney et al. | 280/124.128 |
| 2004/0150178 A1 * | 8/2004 | Smith | 280/86.751 |
| 2004/0223835 A1 | 11/2004 | Tuvim | |
| 2005/0253352 A1 * | 11/2005 | Ziech | 280/124.128 |
| 2006/0186616 A1 * | 8/2006 | Rudiger | 280/6.15 |
| 2007/0145705 A1 * | 6/2007 | Ramsey et al. | 280/124.128 |
| 2008/0018064 A1 * | 1/2008 | Martin et al. | 280/6.152 |
| 2008/0253872 A1 | 10/2008 | Tollefson | |
| 2009/0250895 A1 * | 10/2009 | Smith | 280/124.125 |
| 2012/0298935 A1 * | 11/2012 | Ross | 254/2 R |
| 2012/0321436 A1 * | 12/2012 | Diniaco | 414/812 |
| 2013/0121797 A1 * | 5/2013 | Welch et al. | 414/498 |

FOREIGN PATENT DOCUMENTS

| | | |
|---|---|---|
| CA | 2188178 | 10/1995 |
| CA | 2333364 | 12/1999 |
| CA | 2392480 | 5/2001 |
| CA | 2448577 | 12/2002 |
| DE | 296 15 967 U1 | 11/1996 |
| DE | 296 17 706 U1 | 12/1996 |
| DE | 197 21 121 A1 | 11/1998 |
| DE | 101 62 292 A1 | 6/2003 |

* cited by examiner

TRAILER FOR TRANSPORTING FREIGHT CONTAINERS AND METHOD OF USE

CROSS-REFERENCE TO RELATED APPLICATION

This application is a divisional of application Ser. No. 12/259,684, filed Oct. 28, 2008 now U.S. Pat. No. 8,182,193.

TECHNICAL FIELD

The present invention relates to a wheel supporting suspension assembly for securing a wheel to opposed sides of a frame.

BACKGROUND ART

Container handling transport vehicles of various types are known for transporting different types of freight containers on existing public roads. However, these transport vehicles and containers have to abide to government regulations when traveling on such public roads. Accordingly, containers are manufactured with strict design regulations as to size. ISO certified containers are also fabricated with specific attachments whereby to be handled and secured during transport, whether by land, sea or air. Handling equipment is also designed to engage these attachments for secure handling and transportation. The trailer design of the present invention is particularly adapted to handle such ISO certified containers which can be rested directly on a ground surface and difficult to access location. Accordingly, there is no requirement to provide elevated frames to support the container elevated for transfer onto conventional trailers such as described for example in U.S. Pat. Nos. 5,417,540, 6,155,770, 6,532,398 and others.

Transporters for picking up containers lying on ground and transferring them on a transport vehicle support frame are also known. A most common type are those open top end containers in which refuse from building sites are deposited and later picked up by pulling the container on a pivoted support frame by a winch and cable, the container is then positively engaged for transport to a refuse disposal site. Other vehicles are also known to handle specific size shipping containers resting on ground, as described in U.S. Pat. No. 6,910,844. Trailer transporters are also known to handle shipping containers resting on ground. U.S. Pat. No. 4,120,413 describes a trailer having adjustable side rails and lift cylinders to load a container onto the side rails for transportation. As well, U.S. Application 2004/0223835 published on Nov. 11, 2004, describes a trailer having a U-shaped frame and lifting members to lift a container from aground surface for transportation. The U-shaped frame is provided with a rear gate. The present invention is concerned with a trailer container transporter of the general type as described in these later two patents referred to.

Briefly, summarizing some of the disadvantages of prior art container road transporters, they are expensive to fabricate, bulky, time consuming to load and unload, require at least two operators, some need hoist or ground support equipment and some cannot operate on rough road conditions or maneuver to pick up containers in restricted spaces and containers resting directly on the ground without supports. Some of the trailer type transporters also do not provide adequate shock damping and can cause damage to the contents of the container during transport on rough roads.

SUMMARY OF THE INVENTION

It is a feature of the present invention to provide a trailer for transporting a container which is preferably, but not exclusively. ISO certified and capable of transporting the container on public roads by a pick-up truck or other small tractor vehicles by means of a fifth wheel attachment.

Another feature of the present invention is to provide a trailer for transporting a container and wherein the trailer has a pair of horizontal side beams that are displaceably adjustable in a horizontal plane to permit handling of containers of different sizes and which facilitates the engagement of the trailer with the container.

Another feature of the present invention is to provide a trailer for transporting a container and which requires a single person to operate and to load and unload a container therefrom.

Another feature of the present invention is to provide a trailer for transporting a container and wherein the trailer is provided with connectors to secure ISO certified containers of different sizes thereto.

Another feature if the present invention is to provide a trailer for transporting a container and which is comprised of displaceable horizontal side beams, each side beam being provided with a wheel suspension to permit the travel of the trailer with a container on public road surfaces or rough road surfaces while providing adequate shock absorption.

Another feature of the present invention is to provide a trailer for transporting a container and wherein the trailer can be engaged with a container disposed in a restricted space.

Another feature of the present invention is to provide a method of transporting a container from a rest position on a ground surface and wherein the container can be loaded on the trailer by a single person and in a substantially horizontal manner.

According to the above features, from a broad aspect of the present invention there is provided a wheel supporting suspension for securing at least a wheel to a side of a frame. The suspension comprises a pivoted wheel support arm secured at a forward pivot end to a pivot pin retained in a frame attachment member for pivotal connection of the pivoted wheel support arm to the frame. A wheel axle assembly is secured at a rear free end of the pivoted wheel support arm and adapted to connect the wheel thereto. A shock absorber connecting bracket is secured to the forward pivot end of the pivoted wheel support arm and has a shock absorber connecting member extending above the pivot pin. The shock absorber connecting member is pivotally displaceable in facial alignment with a stationary shock absorber connector secured to the frame. A shock absorber is retained captive between the shock absorber connecting member and the stationary shock absorber connector and compressible therebetween by the shock absorber connecting member being displaced towards the stationary shock absorber connector by upward movement of the pivoted wheel support arm to absorb vertical displacement loads transmitted to the pivotal wheel support arm by the wheel connected thereto.

BRIEF DESCRIPTION OF THE DRAWINGS

A preferred embodiment of the present invention will now be described with reference to the accompanying drawings in which.

DESCRIPTION OF PREFERRED EMBODIMENTS

Referring now to the drawings and more particularly to FIGS. 1 to 4, there is shown generally at 10 the container transport trailer of the present invention for transporting a freight container 11 and preferably, but not exclusively. ISO certified containers. The trailer 10 has a front frame section 12 provided with a towing frame structure 13 for removable attachment to a hitch 14, herein a fifth wheel hitch, secured in the box 15 of a pick-up truck 16. It is also conceivable that instead of a pick-up truck that a tractor or a motorized cab may be constructed particularly suited to handle the trailer 10 of the present invention with the trailer 10 secured to a pivotal connection (not shown) in the rear of the cab by a different type of towing frame structure, for attachment to a coupling plate of a tractor or a pintle hook of a truck or trailer.

Figure 2:
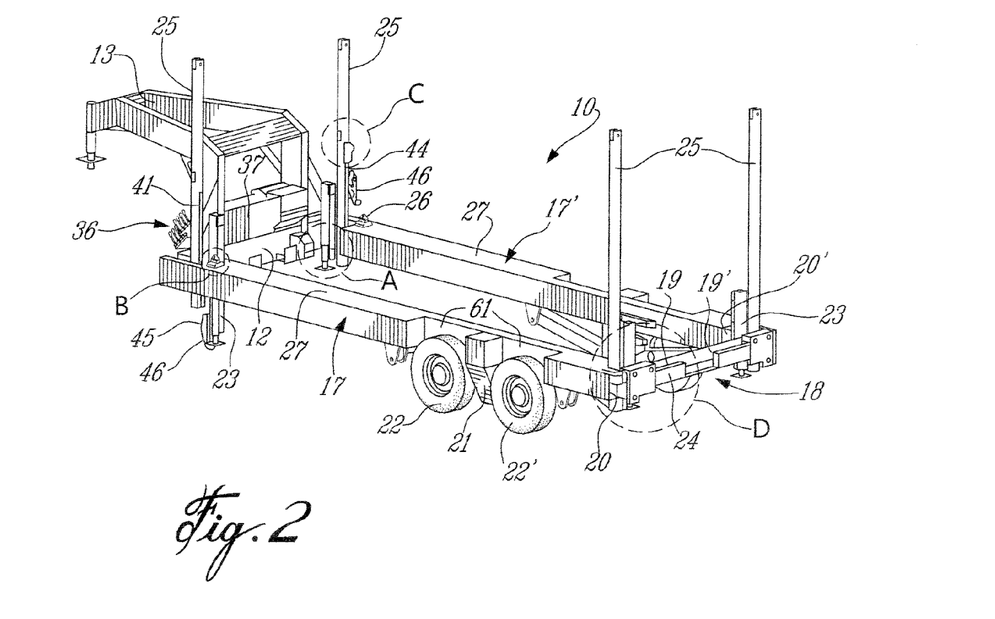
FIG. 2 is a perspective view of the trailer showing some of the component parts thereof.
Figure 3:
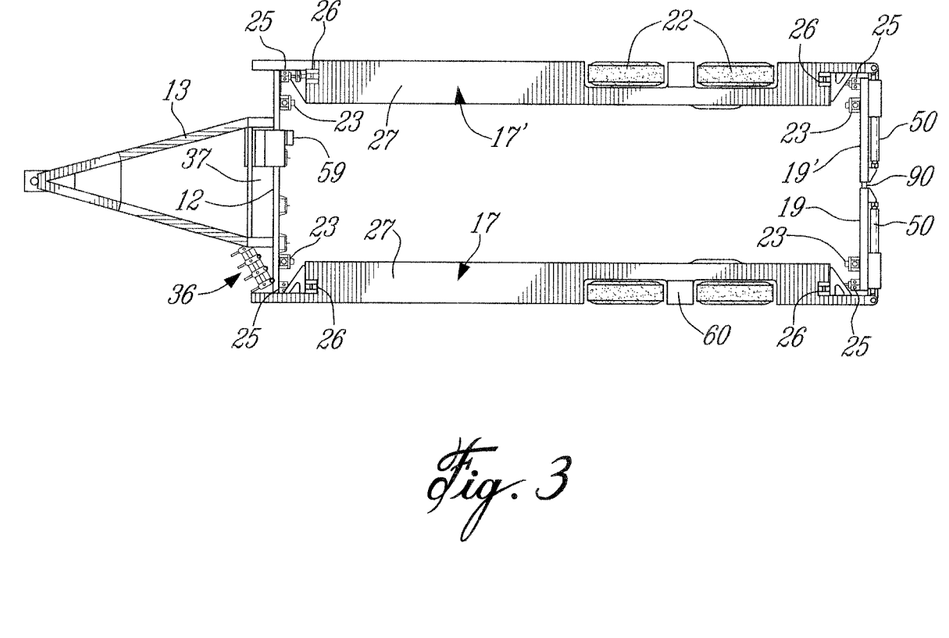
FIG. 3 is a top view of FIG. 2.
Figure 4:
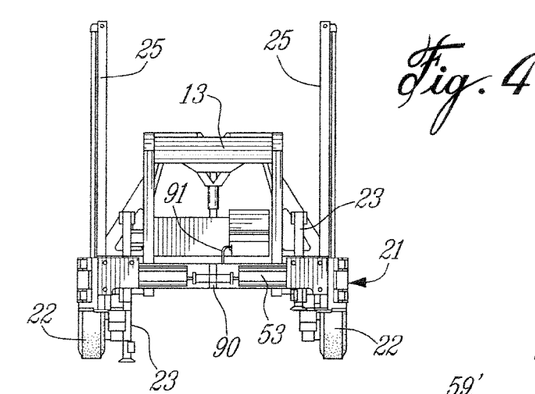
FIG. 4 is a rear view of FIG. 2.

Details of the trailer will now be described with further reference to FIGS. 2 to 4. As herein shown, the trailer 10 has a front frame section 12, as above-described, and to which is secured a pair of displaceable horizontal side beams 17 and 17' which are displaceable in substantially parallel planar relationship to one another in an outward and inward direction, as will later be described. A hingeable rear gate 18 is formed by a pair of hinge arms 19 and 19'. Each hinge arm is hingedly secured to a respective one of the horizontal side beams 17 and 17' at a rear end 20 and 20' of the side beams 17 and 17', respectively. The hinge arms 19 and 19', when in their closed position, as illustrated in FIGS. 2 and 3, are interlocked at their free ends by a locking mechanism 90 which is actuated by a locking arm 91 as better illustrated in FIG. 4. Details of this mechanism are not illustrated herein as any suitable type of locking mechanism is conceived to interlock the hinge arms 19 and 19' in their closed position.

Each of the horizontal side beams 17 and 17' are provided one or more, herein two, wheel supporting suspension assemblies 21 and 21' respectively, and independently displaceable to absorb shocks. This suspension 21 and 21' will be described in more detail later.

Retractable vertical lifting means in the form of vertically supported telescopic lifting legs 23 are secured to a portion of the front frame 12, herein adjacent opposed ends thereof, inside the horizontal side arm 17. These telescopic lifting legs 23 are also secured to each of the hinge arms 19 and 19' adjacent their inner end portions thereof. When these telescopic vertical lifting legs are extended they lift the horizontal side beams 17 and 17', as well as the wheels 22, off the ground surface. This is necessary in order to actuate laterally extendable means, namely pistons 50, which forms part of a transverse extendable connecting mechanisms 24 secured to each of the hinge arms 19 and 19' and to opposed sides of the front frame section 12 whereby to displace the horizontal side beams 17 outwardly and inwardly with respect to one another. The side beams may be displaced independently or in unison by operating the hydraulic controls 36.

The trailer 10 is further provided with container lifting and lowering posts, herein four such posts 25, secured in a respective one of four corner areas of the trailer frame. These container lifting posts 25 permit removable connection to a container 11 positioned between the side beams 17 and 17' to lift and lower the container therebetween, in a substantially horizontal plane, to permit engagement of the container onto the horizontal side beams 17 and 17' as will be described later. Container connecting means in the form of container locking devices 26 are also secured on atop surface 27 of the horizontal side beams 17. Only four such container locking devices 26 are herein shown but the side beams may be fitted with attachments to removably secure additional ones of the locking devices for handling containers of different lengths. These container locking devices 26 are also adapted to secure to the attachments provided in the corners of ISO certified containers or other such containers and they are well known in the art. The side beams 17 and 17' are capable of each supporting a load of 4800 lbs. for a total handling capacity of 19,200 lbs. and a total load of 22,700 lbs. on the suspension of four wheels for the "pick-up truck" version herein illustrated.

Figure 5:
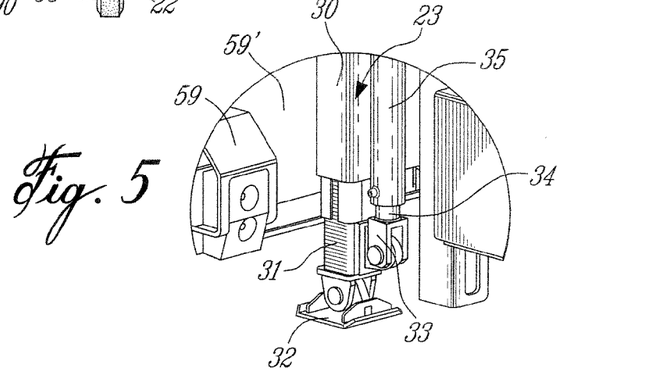
FIG. 5 is an exploded view showing the construction of the retractable vertical lifting mechanism to lift the pair of horizontal side beams and its wheels above a ground surface.

Referring to FIG. 5, there is shown in exploded view, the bottom portion of the telescopic vertical support leg assembly 23 as identified in the circled portion A of FIG. 2. The vertically supported telescopic leg assembly 23 comprises a steel tube 30 in which there is slidingly and telescopically received a steel post 31 constituting the leg. A hinged foot plate 32 is secured to the bottom end of the post 31 to engage the ground surface. The post 31 is slidingly received within the tube 30 and displaceable by a piston rod end connection 33 secured to the free end of piston rod 34 of piston cylinder 35. All piston cylinders 35 may be operated in unison by the hydraulic controls 36 conveniently located at the front end of the trailer 10 next to the hydraulic unit 37. Alternatively, they may be operated individually if need be to lift the container 11 substantially horizontally not to displace the freight contained therein.

Figure 7:
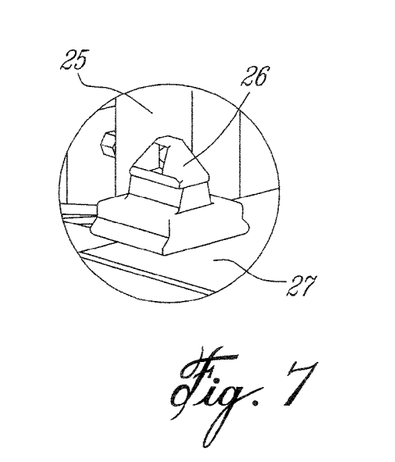
FIG. 7 is a perspective view showing the connection of a container corner locking device for engaging ISO certified containers.

FIG. 7 illustrates the construction of the container locking device 26 as shown in the circled portion B in FIG. 2 and this locking device is positioned to be received within the corner connectors of the container, as is well known in the art. Accordingly, their construction and operation will not be described herein, sufficient only to say that, as shown in FIG. 3, these are located at a precise location on the top surface 27 of the horizontal side beams 17 and 17' to engage with the locking connectors in the four bottom corners of the ISO certified container.

Figure 1:
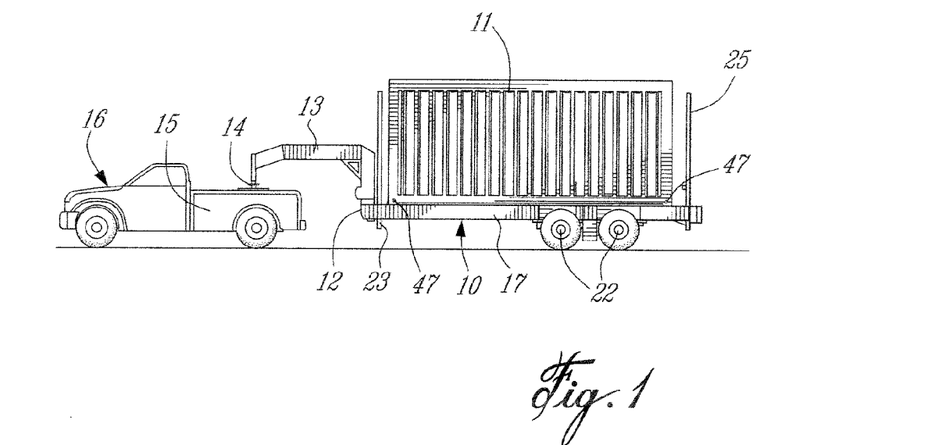
FIG. 1 is a side view showing the trailer of the present invention secured to a fifth wheel connection of a pick-up truck and wherein a container has been loaded onto the trailer.
Figure 6:
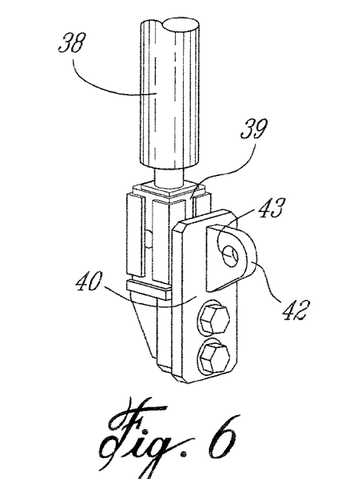
FIG. 6 is a perspective view of the coupling connector connected to the lifting cylinder of the container lifting and lowering posts.

FIG. 6 is a perspective view of the circle portion C of FIG. 2 but partly fragmented whereby only the mechanism mounted in the lifting post 25 is shown herein. As herein shown, a piston lifting cylinder 38 is secured within each of the posts 25 and it has a piston rod end connection 39 secured to a coupling connector 40 which has a connecting flange 42 which is vertically displaced along a vertical slot opening 41 in the lower section of the post 25, as shown in FIG. 2. The connecting flange 42 which slides along the slot 40 and extends outwardly thereof. The connecting ear 42 has an attachment hole 43 to secure a chain 44 thereto. The chain 44 has a hook 45 at its end, as shown in FIG. 2, to which a container coupling connector 46 is secured to engage the connectors 47 provided in the four corners of the container 11, as shown in FIG. 1. These coupling connectors 46 are engaged while the container 11 is resting on the ground surface. By actuating these piston lifting cylinders 38 by the controls 36 the container is lifted off the ground in a substantially horizontal plane to safeguard its content. After the container is re-deposited onto the ground or ground supports, after transport to its destination, the connectors are disengaged. If the container is not lying horizontally, the length of the chains can be adjusted to compensate for the tilt of the container if all of the lifting cylinders are to be operated simultaneously.

Figure 8:
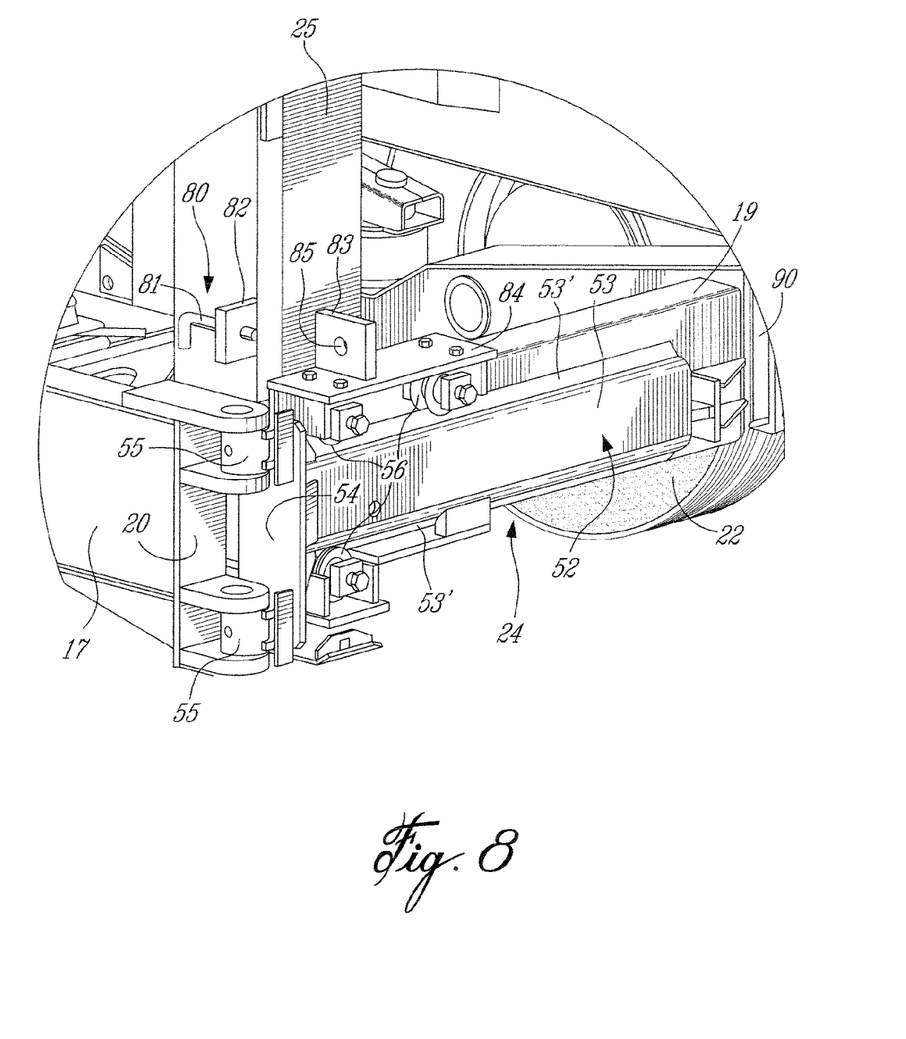
FIG. 8 is a fragmented perspective view of the transverse extendable connecting mechanism as secured to one of the rear gate hinge arms.
Figure 10:
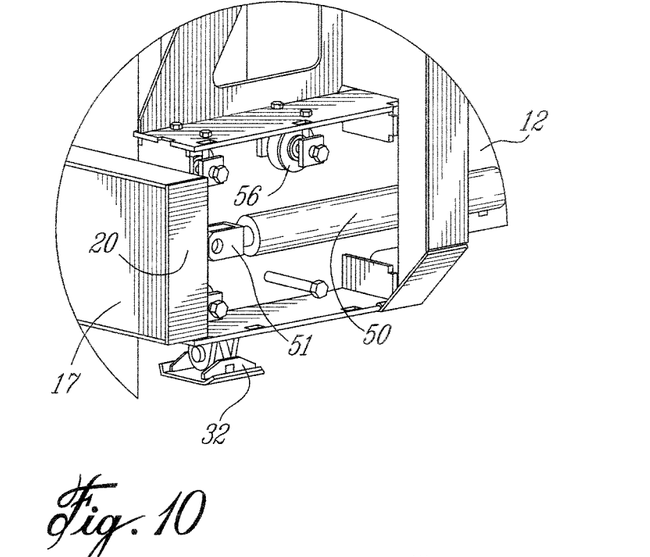
FIG. 10 is a further perspective view of the transverse extendable connecting mechanism as secured to the front frame section of the trailer but with some portions thereof having been removed to show the cylinder connection.

FIG. 8 is an enlarged view of the circle portion D of FIG. 2 and illustrates, in part, the construction of the transverse extendable connecting mechanism 24. One of these extendable connecting mechanisms 24 is secured to opposed sides of the front frame section 12 and to each of the hingeable rear gates. The detail D shows the mechanism secured to one of the hingeable rear gates, herein gate 19. FIG. 8 will be described with further reference to FIG. 10 which shows part of the extendable connection 24 secured to the front frame section but with parts thereof having been removed to illustrate the entire construction. As herein shown, the extendable connecting mechanism has a hydraulic piston cylinder 50 having a piston rod end connection 51 secured to the horizontal side beams 17 and 17' and by actuating the cylinder 50, by use of the manual controls 36, the horizontal side arms 17 and 17' can be displaced outwardly and inwardly with respect to one another. To do so the side beam needs to be coupled at opposed ends to the front frame section 12 and to associated one of the hinge arms 19 and 19' by a sliding coupling assembly 52 as shown in FIG. 8.

The sliding coupling assembly 52 is constituted by a slide plate 53 which is secured to a hinge flange 54 attached to a hinge connection 55 at the rear end 20 and 20' of the side beams 17 and 17', respectively. The slide plate 53 is displaceably retained captive between guide wheels 56, one of which is not shown in FIG. 8 for ease of illustration, and which are secured to the hinge arms, herein hinge arm 19, to permit sliding displacement of the slide plate 53 therebetween and along a straight longitudinal axis of the hinge arm. This slide plate 53 is shaped to extend over the cylinder 50, which is not shown in FIG. 8, but located therebehind. Accordingly, the slide plate 53 also provides a cover for the cylinder 50 to protect it from foreign matter. These guide wheels 56 are disposed for frictional rotational engagement with opposed parallel edge portions 53' of the slide plate 53.

Figure 9:
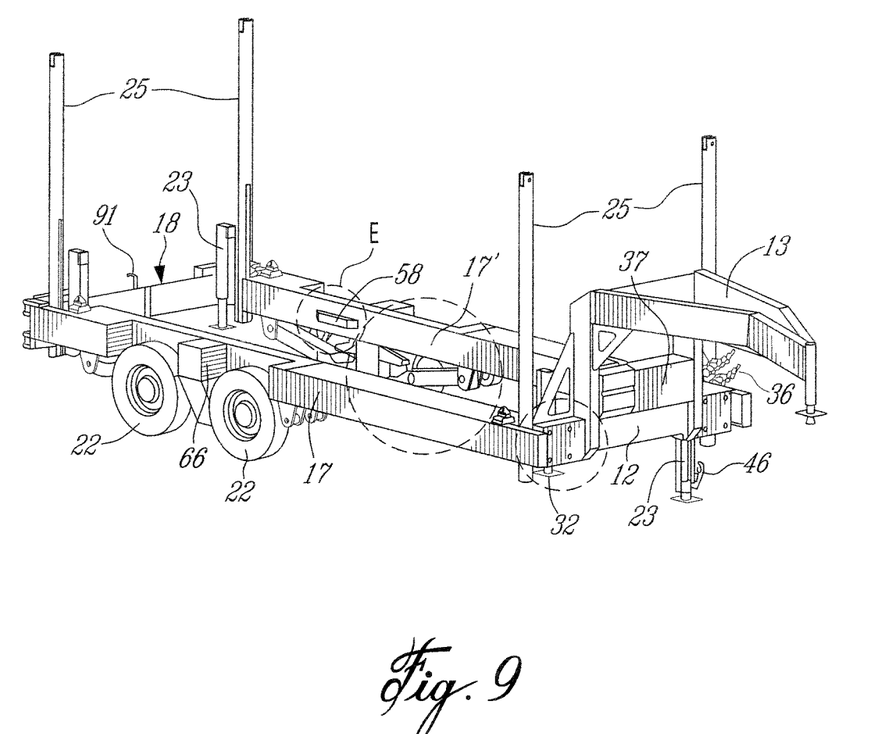
FIG. 9 is a further perspective view of the trailer of the present invention as seen from a different angle.
Figure 11:
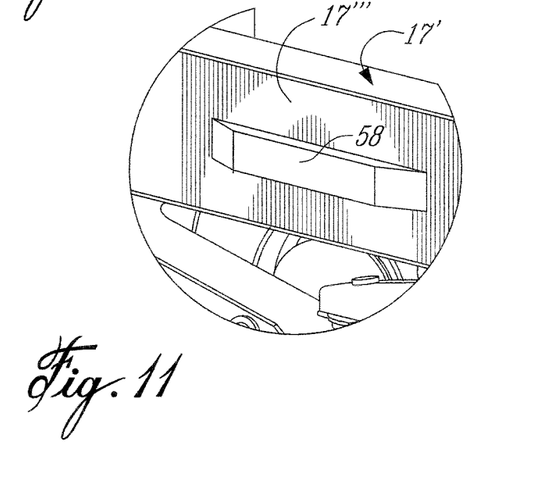
FIG. 11 is an enlarged fragmented view showing the construction of the container alignment pads secured on the inner face of the horizontal side beam.

As shown in FIGS. 9 and 11, each of the side beams 17 and 17' are provided with container alignment pads 58 on the inner surface 17'''. FIG. 11 is an enlarged view of the circle portion E shown in FIG. 9 which illustrates the shape and location of the pads 58. These container alignment pads 58 protect the inner side surface 17''' of the horizontal side arms 17 and 17' while the trailer is backed-up about the container 11. They also provide guides when the trailer is backed into and about the container from the rear open gate, as will be described later. Also, and as shown in FIGS. 3 and 5, one or more bumpers 59 are secured to the inner side wall 59' of the front frame section 12 to provide an abutment against the container forward end when the trailer is backed in around the container.

Figure 12:
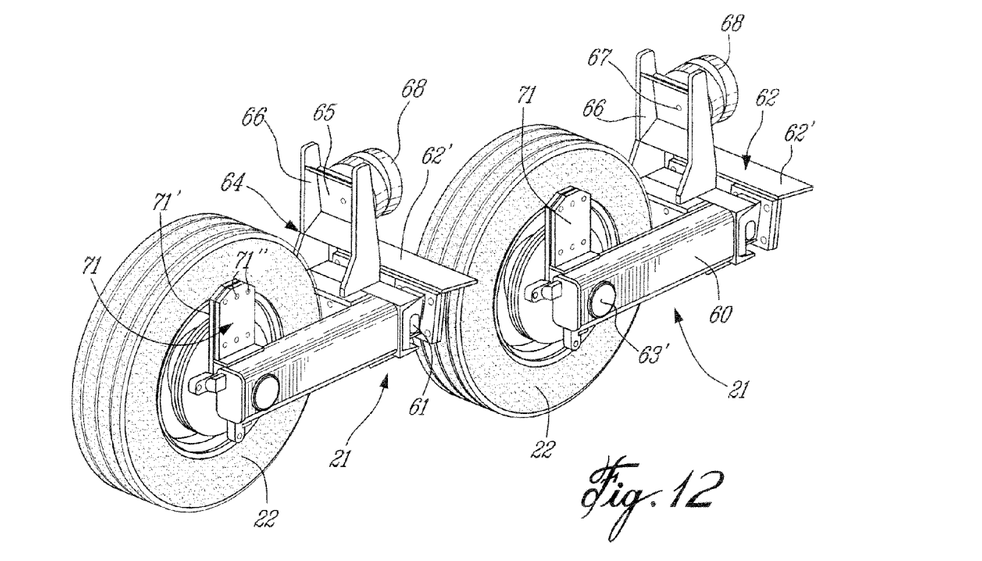
FIG. 12 is a perspective view of a pair of wheel supporting suspension constructed in accordance with the present invention for securement to a trailer frame.
Figure 13:
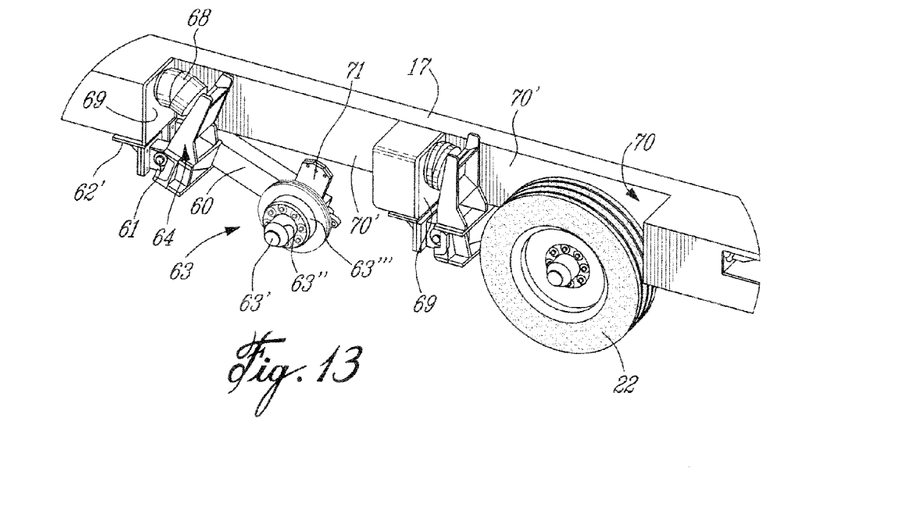
FIG. 13 shows two of the wheel supporting suspensions secured to a trailer side frame with one of the suspensions having the wheel removed therefrom for the purpose of illustration.

With reference now to FIGS. 12 to 16C, there will be described the construction and operation of the wheel supporting suspension assembly 21. There are two suspension wheel assemblies 21 shown in FIG. 2 and shown in engagement with the side beam 17 of the trailer on an outboard side thereof. As shown in FIG. 13 there are two such wheel supporting suspension assemblies secured to each of the opposed side beams 17 and 17' and these suspensions operate individually. Each suspension assembly is comprised of a pivoted wheel support arm 60 secured at a forward pivot end to a pivot pin 61 (see FIG. 13) retained in a flame attachment member 62 for pivotal connection of the pivoted wheel support arm to the side beam 17 of the trailer frame.

A wheel axle assembly 63 is secured at a rear free end of the pivot arm 60 and adapted to connect to a wheel 22 as previously described and illustrated in FIG. 2, for example. A shock absorber connecting bracket 64 is secured to the forward pivot end of the pivotal wheel support arm 60 and has a shock absorber connecting member 65 extending above the pivot pin 61 and spaced therefrom. The shock absorber connecting member 65 is in the form of a flat seating plate secured to a support frame 66 which forms part of the shock absorber connecting bracket 64. A connecting fastener in the form of a bolt 67 secures a compressible shock absorber 68 in facial contact therewith and in a manner well known in the art.

As shown in FIG. 13, when the wheel supporting suspension assembly 21 is secured to the side beam 17, the shock absorber seating plate 65 is disposed in facial spaced relationship with respect to a stationary shock absorber connector, herein a flat seating wall 69 formed at the front end of a recessed wall portion 70 formed in the outboard portion of the side beams. There are two such recessed wall portions which are spaced-apart. The shock absorber pad 68 is retained captive between the shock absorber connecting plate 65 and the stationary vertical seating plate 66 and compressible therebetween by the shock absorber connecting member, herein the plate 65, being displaced towards the stationary shock absorber plate 66 by the load imposed by the trailer frame and any additional load supported thereon which causes pivotal upward movement of the wheel support arm to absorb vertical displacement loads transmitted to the arm by the wheel connected thereto and resting on the ground surface.

As shown in FIGS. 12 and 13, the pivotal wheel support arm 60 is also provided with a lateral displacement stabilizing vertical extension plate 71 immovably secured to the pivotal wheel support arm 60. The extension plate is provided with a vertical flat friction surface 71' which is displaceable against a flat vertical arresting surface, herein the vertical wall 70' of the recess well portion 70 of the side beam on an outboard side of the side beam. This plate prevents lateral displacement of the support arm. As well, to add further lateral stability there is provided a bushing 72 of shock absorbing material immovably retained in the frame attachment member 62 as better seen in FIG. 15 and disposed about the pivot pin. This stabilizes the pivot pin joint and absorbs forces that may be transmitted to the pivot pin. It is pointed out that the vertical flat friction surface 71' of the vertical extension plate 71 is provided by an ultra-high molecular weight polyurethane plate which is secured to a surface of the vertical extension plate by a fastener, such as fasteners 71" shown in FIG. 12.

The wheel supporting suspensions 21 are secured to an underface of the side beam 17 by bolt fasteners or welding of the frame attachment member 62, herein a connector plate 62' to the undersurface of the side beam forwardly of the recessed wall portions or cavities 70.

Figure 14:
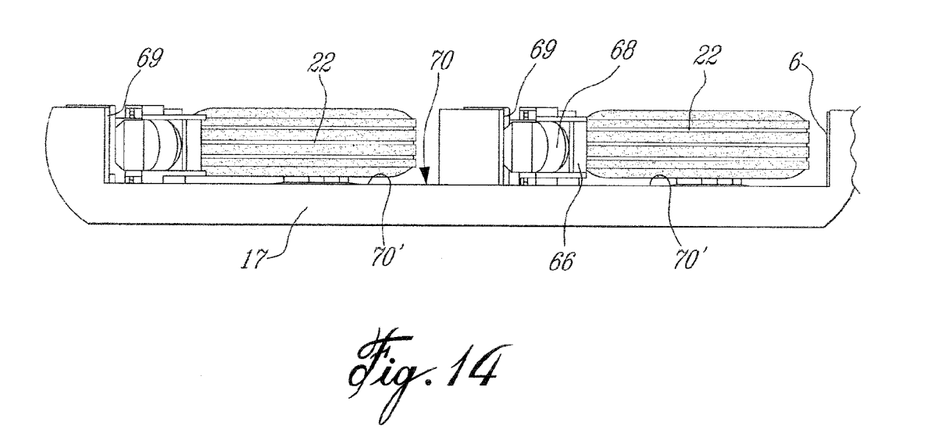
FIG. 14 is a top view showing two wheel supporting suspensions secured to the trailer side frame on an outer side of the side frame.
Figure 16A:
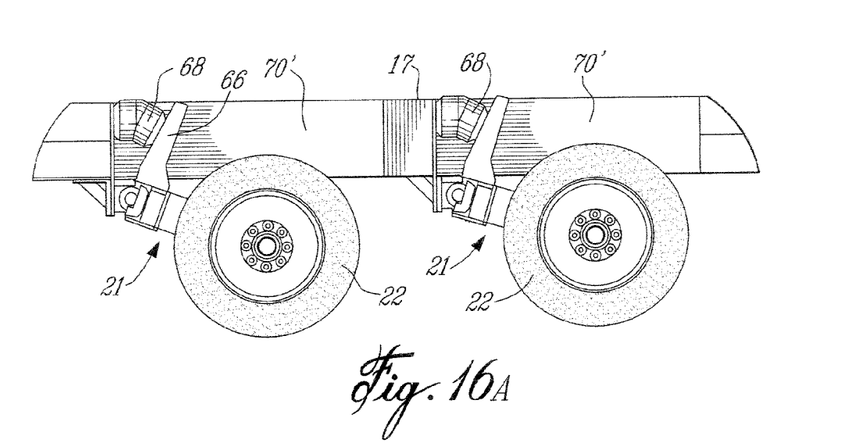
FIGS. 16A to 16C are side views showing the operation of the wheel supporting suspension from an unloaded position to a fully loaded position.
Figure 16B:
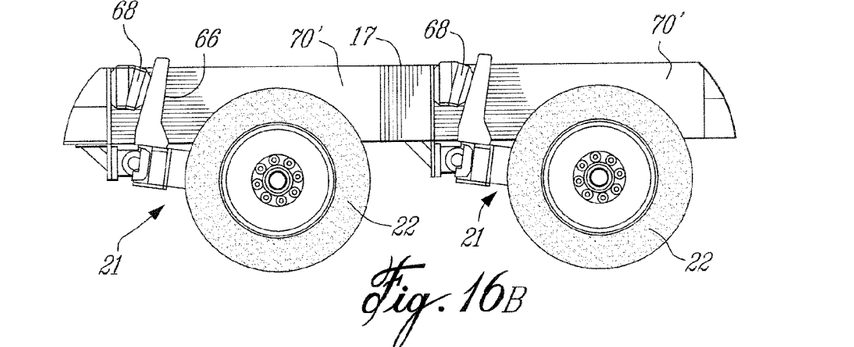
Figure 16C:
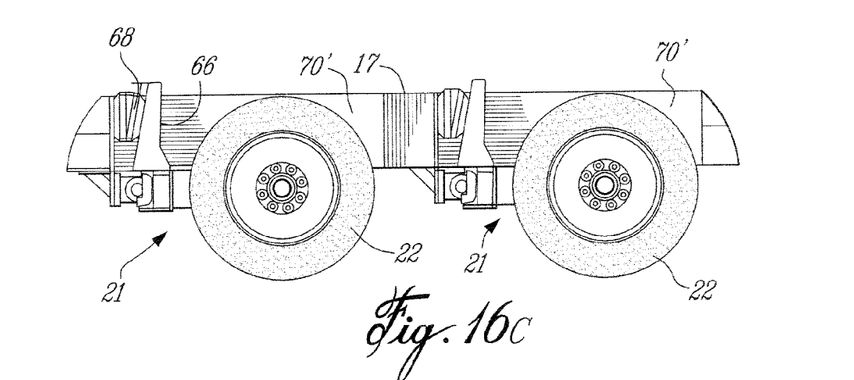

The top view of FIG. 14 illustrates the position of the wheels 22 with respect to the suspension assembly 21. FIG. 16A shows the suspension assemblies 21 when secured to the trailer side beams 17 without a container connected to the trailer. The weight of the trailer is approximately 1250 lbs. FIG. 16B illustrates the suspension in partial compression when the trailer is loaded with a load of approximately 22,700 lbs. As herein shown, the shock absorbers are compressed. FIG. 16C shows the shock absorbers in maximum compression.

Figure 15:
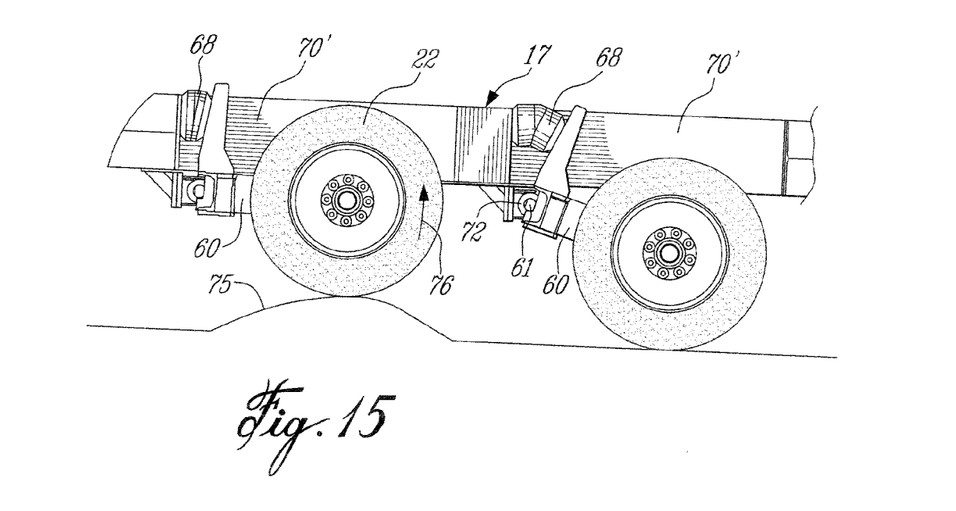
FIG. 15 is a side view showing the operation of the independent suspensions when encountering obstacles on a road.

It is pointed out that this suspension assembly 21 was designed to be able to take a total load of 22,700 lbs. without a thru axle extending across the frame as between two wheels, as is conventional with tractor trailers. This suspension was designed whereby each side of a trailer is independent from the other side. The smoothness of the ride is assured by the independent suspension and shock absorbers. As shown in FIG. 15, while one wheel is pushed up in the direction of arrow 76 by a bump 75, thus creating a sudden load increase, the other wheel, herein wheel 22', will remain independent. When the pivotal arm 60 is at the end of its travel, the shock absorber 78 will be squeezed to absorb the energy. Both shock absorbers work independently.

As shown in FIG. 13, the spindle 63" of the wheel axle assembly 63 provides the link between the bearing (not shown) and the drum 63'''. It is attached to the axle 63' and it is a non-moving part of the wheel end. The drum 63''' is the link between the wheel 22 and the spindle. The wheel 22 is attached to the drum and the drum rotates on the spindle bearing (not shown). Electric brakes (not shown) are located inside the drum and help the pick-up truck and trailer to brake faster and safer.

Referring again to FIG. 8, a manual locking device 80 is provided adjacent opposed ends of the side beams 17 and 17', only one being shown herein, to lock the side beams with respect to the front frame section 12 when displaced to an outward extended position and to also lock the hinge arms 19 and 19' in an open position, substantially in alignment with the side beams when the side beams are in their outward position. Any convenient manual locking device may be provided to effect this interlocking and, as herein shown in FIG. 8, a lock pin 81 is displaceably retained in a bracket 82 secured to the lifting post 25 whereby to engage with a further bracket 83 extending from the wheel supporting top plate 84 of the guide wheels 56. The bracket 83 is also provided with a hole 85 to receive the locking bolt 81 in locking engagement therewith.

Having described the construction of the container transport trailer 10 of the present invention, there will now be described its method of use.

Figure 17A:
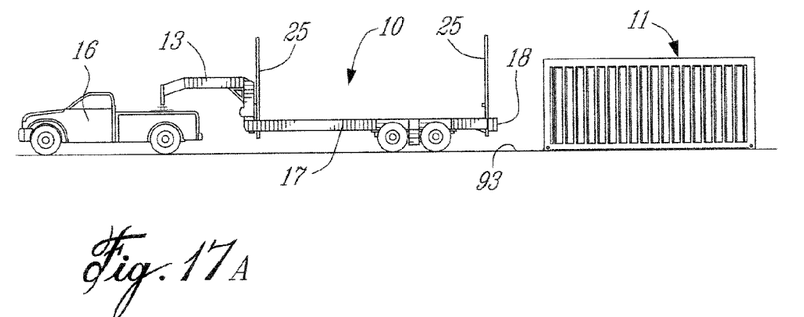
FIGS. 17A to 17K are side views showing the method of use of the trailer of the present invention for engaging a container resting on a ground surface.
Figure 17B:
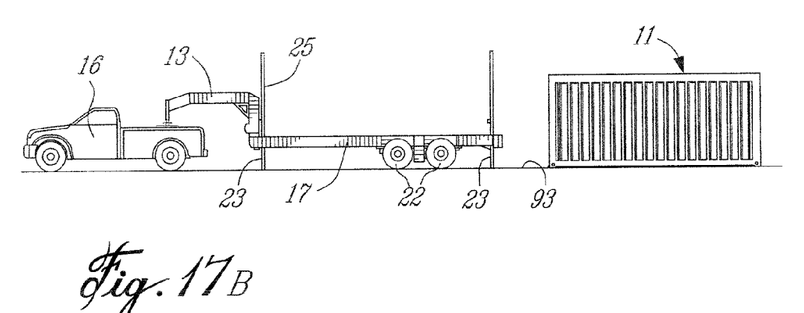
Figure 17C:
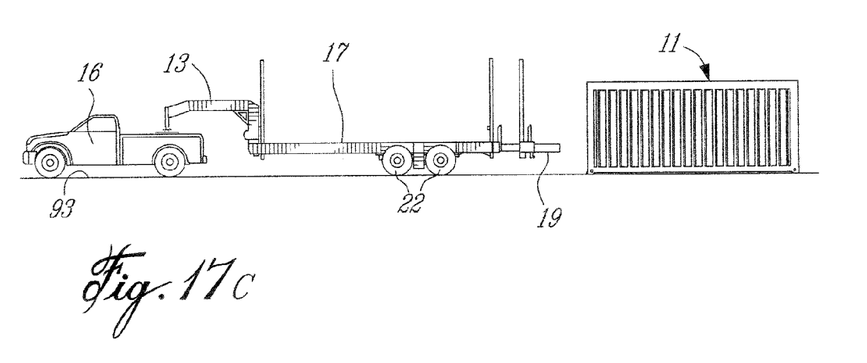
Figure 17D:
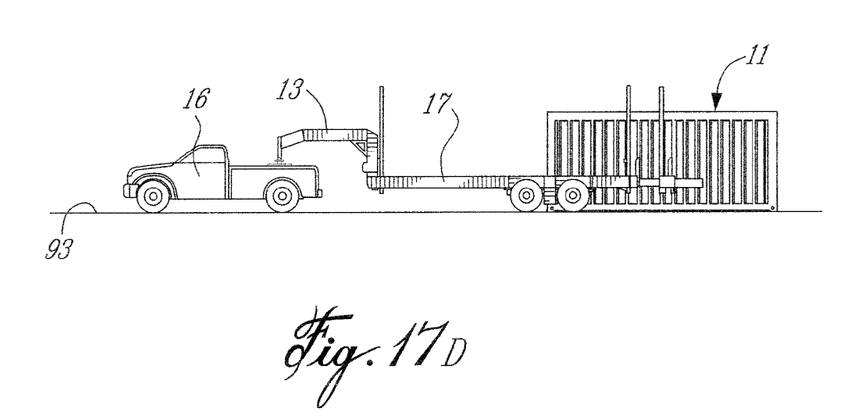

With reference now to FIGS. 17A to 17K there is now described the method of engaging the trailer 10 to the freight container 11. Firstly, as shown in FIG. 17A, the pick-up truck 16 positions the trailer 10 near the container 11 and in straight alignment therewith and far enough to provide sufficient space to open the rear gate 18. The operator than starts the hydraulic unit 37 and, using the hydraulic controls 36, causes the telescopic lifting legs 23 to be extended, as shown in FIG. 17B, and sufficiently to lift the trailer and its support wheels 22 off the ground surface 93. The four corners of the horizontal side arms 17 is manually unlocked from the locking mechanisms 80 and again using the hydraulic controls 36, the pistons 50 are actuated whereby to displace the opposed side beams 17 and 17' outwardly to enlarge the space therebetween sufficient to permit the trailer to be safely backed up around the container without damage to the trailer or the container. The hinge arms 19 and 19' of the rear gate are then locked in their open position by the locking mechanism 80. The telescopic lifting legs 23 are then lifted by the hydraulic controls 36 so that the trailer wheels are again resting on the ground. The trailer is then ready to be backed up about the container, as shown in FIG. 17C.

Figure 17E:
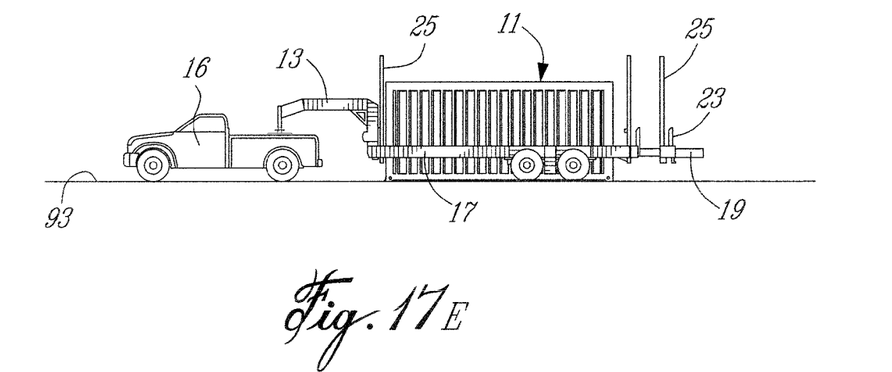
Figure 17F:
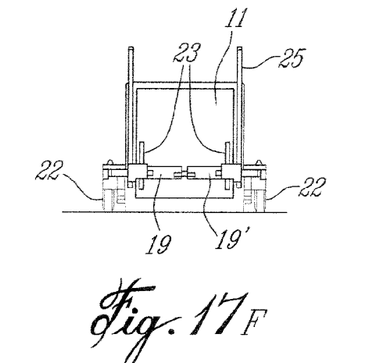

The operator of the pick-up truck 16 slowly backs the trailer about the container 11 until the container hits the bumper 59 secured to the inner face of the front frame section 12. The operator then engages the parking brake on the pick-up truck and is now in a position to load the container, as shown in FIG. 17E. However, before doing so, the hingeable rear gate 18 is closed and the hinge arms 19 and 19' are locked together. With the use of the hydraulic controls 36, the coupling connectors 40 in the container lifting post 25 are lowered and the connector 46 is positioned adjacent a corner of the container where the connectors 46 are engaged within the corner connectors 47 of the container 11. This attachment to the container is done manually by the operator in the four corners of the container. The lifting cylinders 38 in the container lifting posts are then actuated in unison or independently to adjust the level of the container. The cylinders 38 withdraw the coupling connector 40 upwardly whereby to lift the container above the horizontal side arm 17, as shown is FIG. 17G in a substantially horizontal manner. This position is also shown in FIG. 17H. FIG. 17F shows a container lying on the ground prior to being lifted. As shown is FIG. 17G, the container lies above the container locking devices 26 on the top surface of the horizontal side beams 17 and 17'. At this position the lifting cylinders are at their end of travel and the container is lifted substantially horizontally not to disturb its cargo or freight.

Figure 17G:
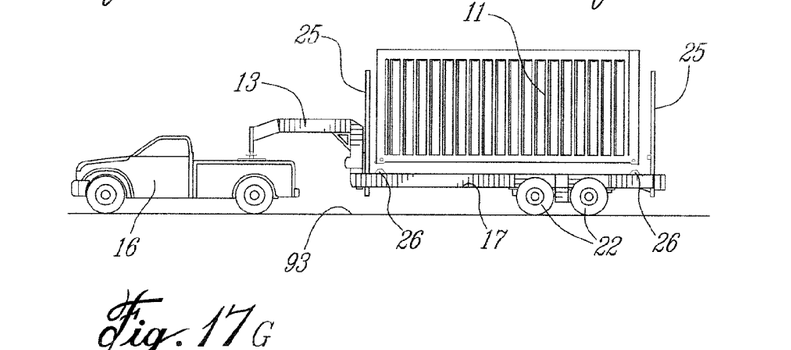
Figure 17H:
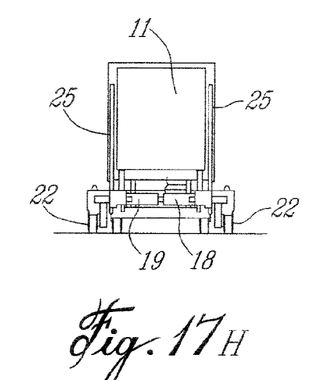
Figure 17I:
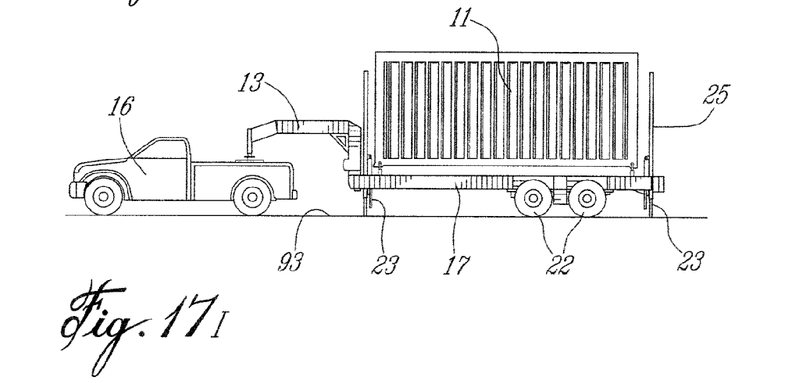
Figure 17J:
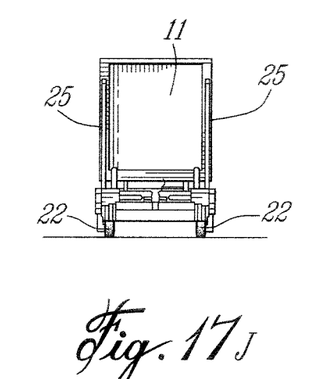
Figure 17K:
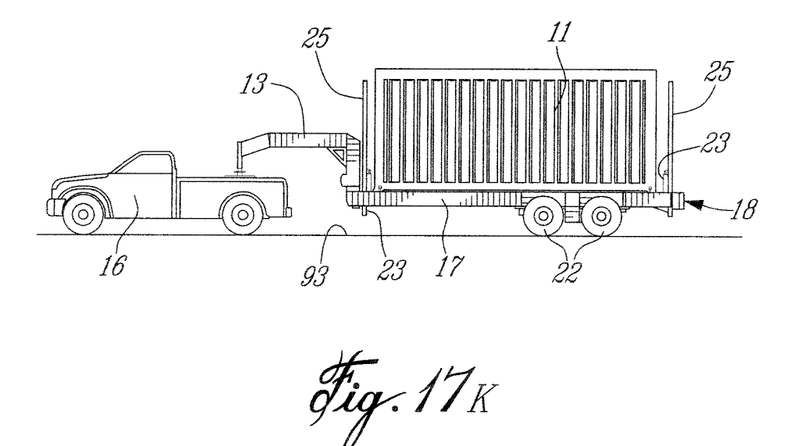

With the container positioned as shown in FIG. 17G the horizontal side beams 17 and 17' and their wheels 22 now need to be lifted off the ground surface 93 by the actuation of the telescopic lifting legs 23 and this is illustrated in FIG. 17I. The wheels 22 should not touch the ground surface when lifted to that position. The pistons 50 are then actuated by the hydraulic controls to retract the horizontal side arms 17 and 17' to their original closed positions where the container locking devices 26 should be aligned with the lower corner connectors 47 of the container 11. The telescopic lifting legs 23 are then retracted so that the wheels are again in engagement with the ground surface 93. Thereafter, the coupling connectors 40 in the container lifting post 25 are lowered by the use of the hydraulic controls 36 to position the corner connectors in the locking devices 26 where they are then engaged with the horizontal side arm 17 of the frame of the trailer 10. After the container locking devices are engaged the operator inspects the trailer to ensure that all locking devices are secured in position. The trailer is now ready to transport the container to a further location where the container is unloaded by going through the same process but in reverse mode.

It is within the ambit of the present invention to cover any obvious modifications of the preferred embodiment described herein, provided such modifications fall within the scope of the appended claims.

We claim:

1. A wheel supporting suspension assembly for securing at least a wheel to a side of a frame, said suspension comprising a pivoted wheel support arm secured at a forward pivot end to a pivot pin retained in a frame attachment member for pivotal connection of said pivoted wheel support arm to said frame, a wheel axle assembly secured at a rear free end of said pivoted wheel support arm and adapted to connect the wheel thereto, a shock absorber connecting bracket secured to said forward pivot end of said pivoted wheel support arm and having a shock absorber connecting member extending above said pivot pin, said shock absorber connecting member being pivotally displaceable in facial alignment with a stationary shock absorber connector secured to said frame, a shock absorber retained captive between said shock absorber connecting member and said stationary shock absorber connector and compressible therebetween by said shock absorber connecting member being displaced toward said stationary shock absorber connector by upward movement of said pivoted wheel support arm to absorb vertical displacement loads transmitted to said pivoted wheel support arm by the wheel connected thereto, a vertical lateral displacement stabilizing plate having a first end secured to said rear free end of said pivoted wheel support arm and a second end free, the vertical lateral displacement stabilizing plate extending vertically above said pivoted wheel support arm, said vertical lateral displacement stabilizing plate having a flat friction surface displaceable against a flat outboard vertical side wall of said frame to prevent lateral displacement of said pivoted wheel support arm when displaced on said pivot pin.

2. A wheel supporting suspension as claimed in claim 1 wherein said frame has a pair of displaceable side beams, each said side beam having one or more rectangular wells formed therein in an outboard side wall of said side beam, each of said one or more wells defining a forward transverse flat wall section for connection of said shock absorber, and a flat straight recessed side wall section constituting said flat outboard vertical side wall of said frame.

3. A wheel supporting suspension as claimed in claim 1 wherein the vertical lateral displacement stabilizing plate is generally perpendicular to the pivoted wheel support arm.

4. A wheel supporting suspension as claimed in claim 1 wherein said shock absorber connecting member is a flat seating plate secured to a support frame of said shock absorber connecting bracket, and a connecting fastener securing an end of said shock absorber thereto, said shock absorber being a pad of compressible material.

5. A wheel supporting suspension as claimed in claim 4 wherein said stationary shock absorber connector is a flat transverse wall surface formed integral with said frame.

6. A wheel supporting suspension as claimed in claim 1 wherein there is further provided a bushing of shock absorbing material immovably retained in said frame attachment member about said pivot pin to stabilize said pivot pin and absorb forces that may be transmitted to said pivot pin.

7. A wheel supporting suspension as claimed in claim 6 wherein said flat friction surface is constituted by an ultra-high molecular weight polyurethane plate secured to said surface of said vertical extension plate, said vertical extension plate being a steel plate.

8. A wheel supporting suspension as claimed in claim 6 wherein said frame has a pair of displaceable horizontal side beams, there being two of said wheel supporting suspensions secured to each said side beam.

9. A wheel supporting suspension as claimed in claim 8 wherein each said side beam has one or more rectangular wells formed therein in an outboard side wall of said side beam, each of said one or more wells having a transverse flat wall section defining said stationary shock absorber connector, and a connecting fastener securing an end of said shock absorber thereto, said frame attachment member being an attachment bracket secured to a flat bottom wall of said side beam behind and adjacent said transverse flat wall section, said pivoted wheel support arm supporting the wheel connected thereto inside one of said one or more rectangular wells.

* * * * *